(No Model.)

E. DICKINSON.
LAMP BURNER.

No. 459,492. Patented Sept. 15, 1891.

Witnesses:
Murray C. Boyer.
R. Schleicher.

Inventor:
Emanuel Dickinson
by his Attorneys
Howson & Howson

UNITED STATES PATENT OFFICE.

EMANUEL DICKINSON, OF PHILADELPHIA, PENNSYLVANIA, ASSIGNOR TO ELIZABETH DICKINSON, OF SAME PLACE.

LAMP-BURNER.

SPECIFICATION forming part of Letters Patent No. 459,492, dated September 15, 1891.

Application filed August 21, 1890. Serial No. 362,661. (No model.)

*To all whom it may concern:*

Be it known that I, EMANUEL DICKINSON, a citizen of the United States, and a resident of Philadelphia, Pennsylvania, have invented certain Improvements in Lamp-Burners, of which the following is a specification.

The objects of my invention are to prevent the accumulation of inflammable gases in the oil reservoir or fountain of a double-wick lamp and to increase the brilliancy of the flame; and these objects I attain in the manner hereinafter set forth, reference being had to the accompanying drawings, in which—

Figure 1:
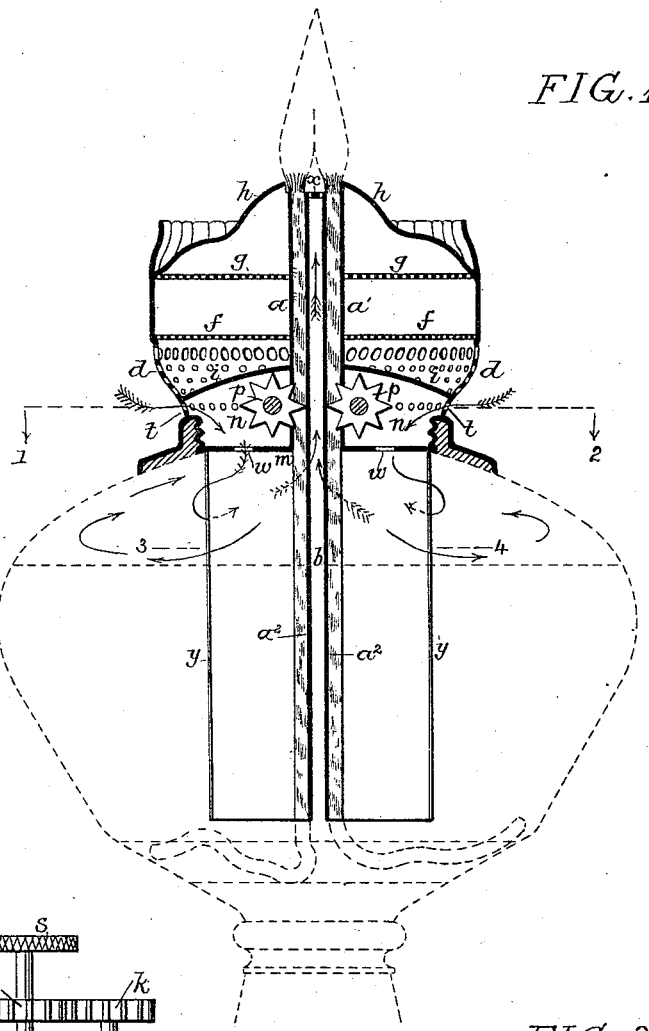
Figure 2:
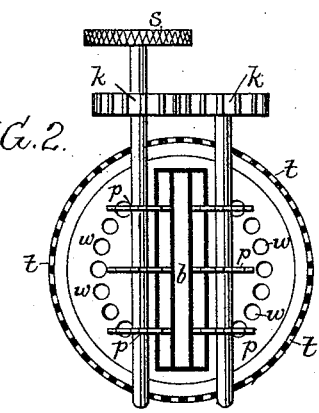
Figure 3:
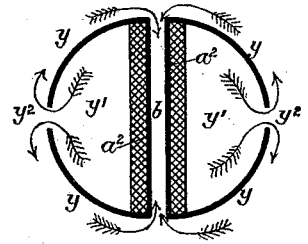

Figure 1 is a longitudinal section of a lamp-burner constructed in accordance with my invention, the oil reservoir or fountain of the lamp being shown by dotted lines. Fig. 2 is a sectional plan view of the burner on the line 1 2, Fig. 1; and Fig. 3 is a sectional plan view on the line 3 4, Fig. 1.

The burner is duplex—that is to say, it has two wick-tubes $a$ $a'$ with intervening chamber $b$—and is provided with the usual perforated casing $d$ and perforated partition-plates $f$ and $g$, through which air gains access to the under side of the dome $h$, and is thereby directed against the outer sides of the flame for the purpose of aiding combustion and increasing the brilliancy of the flame. Some distance above the bottom of the burner, however, is an imperforate transverse partition $i$, preferably dome-shaped, as shown in Fig. 1, so as to form in the lower portion of the burner—that is to say, between this dome $i$ and the bottom $m$ of the burner—a chamber $n$, which in the present instance contains the notched feed-wheels $p$, whereby the wicks are raised and lowered, the shafts of these wheels being geared together by means of spur-wheels $k$, as shown in Fig. 2, so that both wicks may be raised or lowered by manipulating a single knob $s$, carried by one of the shafts. In the casing of the burner beneath the dome $i$ are openings $t$, and in the bottom plate $m$ of the burner are openings $w$, and the central chamber or passage $b$ between the two wick-tubes opens at the bottom into the oil fountain or reservoir of the lamp above the level of oil therein, while the upper portion of said chamber is in communication, through a perforated plate $x$, with the space between the two wicks of the lamp. Projecting downward from the plate $m$ are segmental plates $y$, which, in connection with extensions $a^2$ of the inner walls of the wick-tubes, form on each side of the burner a chamber $y'$, which communicates with the fountain of the lamp above the level of the oil through the gap or slot $y^2$ between the segmental plates $y$, forming the outer wall of said chamber. As the flame rising from the wicks joins above the same, a partial vacuum is created in the chamber $b$ and in that portion of the oil fount or reservoir of the lamp above the level of oil therein, so that air is caused to enter the openings $t$ in the casing of the burner, and this air passes through the openings $w$ in the bottom of the burner and enters the chambers $y'$ and passes therefrom through the openings $y^2$ into the upper portion of the oil fount or reservoir, from which, after passing round the segmental plates $y$, it is withdrawn through the central passage $b$ between the two wick-tubes. A constant circulation of fresh air through all portions of the oil fount or reservoir above the oil is thus kept up as long as the lamp is in use, and the accumulation of inflammable gases in the oil fount or reservoir is effectually prevented, and the lamp is rendered perfectly safe, such gases as may be generated being immediately carried off by the current of fresh air and with the latter striking the flame at the upper end of the burner and serving to facilitate combustion and increase the brilliancy of the flame.

Although the imperforate dome $i$ may in some cases be dispensed with in carrying out my invention, its use is much to be preferred in all cases, as it prevents the downward current of air into the oil fountain or reservoir of the lamp from interfering with the upward current into the dome, this separation of the two currents insuring the effective performance of its function by each. The plates $a^2$ may also be dispensed with, if desired, the wicks forming the inner walls of the chambers $y'$.

Although I have described the invention as applied to lamp-burners, it will be evident that this term includes burners intended for oil-stoves as well.

Having thus described my invention, I claim and desire to secure by Letters Patent—

1. The combination, in a lamp-burner, of the two wick-tubes, the passage between the same communicating at its lower end with the fountain or reservoir of the lamp and discharging at its upper end adjacent to the upper ends of the wick-tubes, passages in the outer casing and bottom of the burner, through which air can enter the oil fountain or reservoir of the lamp from outside the burner, and guards or shields forming air-receiving chambers on the outer side of each wick, said guards or shields having discharge-openings in their outer portions at points remote from the wick, substantially as specified.

2. The combination, in a lamp-burner, of the two wick-tubes, the passage between the same, openings in the bottom and sides of the burner-casing, whereby air can enter the oil fountain or reservoir through the lower portion of the burner, and air-receiving chambers within the lamp-fountain formed by downward extensions of the wick-tubes, and segmental plates separated at the outer edges so as to direct the air into the fountain of the lamp at points remote from the central passage between the wick-tubes, substantially as specified.

In testimony whereof I have signed my name to this specification in the presence of two subscribing witnesses.

EMANUEL DICKINSON.

Witnesses:
EUGENE ELTERICH,
HARRY SMITH.